United States Patent
Moon et al.

(10) Patent No.: US 12,519,493 B2
(45) Date of Patent: Jan. 6, 2026

(54) ELECTRONIC DEVICE INCLUDING DUPLEXER INCLUDING FILTER HAVING CHARACTERISTIC THAT IS ADAPTIVELY CHANGED ACCORDING TO STATE

(71) Applicant: SAMSUNG ELECTRONICS CO., LTD., Suwon-si (KR)

(72) Inventors: John Moon, Suwon-si (KR); Taeyoung Kim, Suwon-si (KR); Hyoseok Na, Suwon-si (KR); Dongil Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 17/969,527

(22) Filed: Oct. 19, 2022

(65) Prior Publication Data
US 2023/0138278 A1 May 4, 2023

Related U.S. Application Data

(63) Continuation of application No. PCT/KR2022/013399, filed on Sep. 6, 2022.

(30) Foreign Application Priority Data

Oct. 29, 2021 (KR) .......... 10-2021-0147404
Nov. 16, 2021 (KR) .......... 10-2021-0158071

(51) Int. Cl.
H04B 1/52 (2015.01)
H04B 1/00 (2006.01)

(52) U.S. Cl.
CPC ......... H04B 1/0096 (2013.01); H04B 1/0057 (2013.01)

(58) Field of Classification Search
CPC ..... H04L 1/0003; H04L 27/186; H04L 27/20; H04L 27/3411; H04L 27/3416; H04L 27/2614; H04L 27/2634
(Continued)

(56) References Cited

U.S. PATENT DOCUMENTS 9,124,355 B2  9/2015  Black et al.
9,270,301 B2  2/2016  Väisänen et al.
(Continued)

FOREIGN PATENT DOCUMENTS

CN  108718219 B  8/2020
JP  7417638 B2   1/2024
(Continued)

OTHER PUBLICATIONS

Extended European Search Report dated Dec. 17, 2024 for EP Application No. 22887333.7.
(Continued)

*Primary Examiner* — Tanmay K Shah
(74) *Attorney, Agent, or Firm* — Nixon & Vanderhye P.C.

(57) ABSTRACT

An electronic device may include an antenna, a radio frequency front end (RFFE) including a first duplexer including a first filter and a second filter and a second duplexer including a first filter and a second filter and at least one processor, operatively coupled with the RFFE, configured to change a cut-off frequency of the second filter in the first duplexer to a first frequency cutting off the sixth signal in portion of the downlink frequency range of the third frequency band partially overlapping the downlink frequency range of the second frequency band or change a cut-off frequency of the second filter in the second duplexer to a second frequency cutting off the fourth signal in portion of the downlink frequency range of the second frequency band partially overlapping the downlink frequency range of (Continued)

the third frequency band. In addition, various embodiments be possible.

20 Claims, 13 Drawing Sheets

(58) Field of Classification Search
USPC .......................................................... 375/295
See application file for complete search history.

(56) References Cited

U.S. PATENT DOCUMENTS

| | | |
|---|---|---|
| 9,705,534 B2 | 7/2017 | Kim et al. |
| 9,866,266 B2 | 1/2018 | Elläet al. |
| 11,569,971 B2 | 1/2023 | Yang et al. |
| 11,936,417 B2 | 3/2024 | Kim et al. |
| 2009/0286501 A1 | 11/2009 | Rousu et al. |
| 2011/0234335 A1 | 9/2011 | Khlat |
| 2018/0062694 A1 | 3/2018 | Emmanuel |
| 2020/0382149 A1 | 12/2020 | Nagamori et al. |
| 2020/0395972 A1* | 12/2020 | Matsumoto ............ H04B 1/401 |
| 2021/0006274 A1 | 1/2021 | Kani |
| 2021/0058220 A1* | 2/2021 | Yang ........................ H04B 1/48 |

FOREIGN PATENT DOCUMENTS

| | | |
|---|---|---|
| KR | 20-1998-0066332 | 12/1998 |
| KR | 10-2019-0120861 A | 10/2019 |
| KR | 2019-0120861 A | 10/2019 |
| KR | 10-2457198 B1 | 10/2022 |
| WO | WO2017158804 A1 | 9/2017 |

OTHER PUBLICATIONS

International Search Report dated Dec. 12, 2022 for PCT/KR2022/013399.
PCT Written Opinion dated Dec. 12, 2022 for PCT/KR2022/013399.
Korean Notification of the Reasons for Rejection dated Oct. 27, 2025 for KR Application No. 10-2021-0158071.

* cited by examiner

ELECTRONIC DEVICE INCLUDING DUPLEXER INCLUDING FILTER HAVING CHARACTERISTIC THAT IS ADAPTIVELY CHANGED ACCORDING TO STATE

CROSS-REFERENCE TO RELATED APPLICATIONS

This application is a continuation of International Application No. PCT/KR2022/013399 designating the United States, filed on Sep. 6, 2022, in the Korean Intellectual Property Receiving Office and claiming priority to Korean Patent Application No. 10-2021-0147404, filed on Oct. 29, 2021, and to Korean Patent Application No. 10-2021-0158071, filed on Nov. 16, 2021, the disclosures of which are incorporated by reference herein in their entireties.

BACKGROUND

Field

Various example embodiments relate to an electronic device including a duplexer including a filter having a characteristic that is adaptively changed according to a state.

Description of Related Art

An electronic device may comprise a radio frequency front end (RFFE) including a duplexer for supporting bi-directional communication via a single path. The duplexer may include a plurality of filters to separate a signal transmitted through an antenna and a signal received through the antenna from each other.

SUMMARY

According to an example embodiment, an electronic device may comprise an antenna, a radio frequency front end (RFFE) comprising a first duplexer comprising a first filter passing a first signal in uplink frequency range of a first frequency band and a second filter passing a second signal in downlink frequency range of the first frequency band and a fourth signal in downlink frequency range of a second frequency band partially overlapping the downlink frequency range of the first frequency band and a second duplexer comprising a first filter passing a third signal in uplink frequency range of the second frequency band and a fifth signal in uplink frequency range of a third frequency band and a second filter passing a sixth signal in downlink frequency range of the third frequency band that is separate from the downlink frequency range of the first frequency band and partially overlaps the downlink frequency range of the second frequency band, and at least one processor, operatively coupled with the RFFE, wherein the at least one processor may be configured to, while both the first duplexer and the second duplexer are electrically connected with the antenna, change a cut-off frequency of the second filter in the first duplexer to a first frequency cutting off the sixth signal in portion of the downlink frequency range of the third frequency band partially overlapping the downlink frequency range of the second frequency band or change a cut-off frequency of the second filter in the second duplexer to a second frequency cutting off the fourth signal in portion of the downlink frequency range of the second frequency band partially overlapping the downlink frequency range of the third frequency band.

According to an example embodiment, an electronic device may comprise an antenna, a radio frequency front end (RFFE) comprising a switch, a first duplexer comprising a first filter passing a first signal in uplink frequency range of a first frequency band and a second filter passing a second signal in downlink frequency range of the first frequency band and a fourth signal in downlink frequency range of a second frequency band partially overlapping the downlink frequency range of the first frequency band and being connectable with the antenna via the switch, a second duplexer comprising a first passing a third signal in uplink frequency range of the second frequency band and a fifth signal in uplink frequency range of a third frequency band and a second filter passing a sixth signal in downlink frequency range of the third frequency band that is separate from the downlink frequency range of the first frequency band and partially overlaps the downlink frequency range of the second frequency band and being connectable with the antenna via the switch, a first impedance matching circuit, electrically connected with a first electrical path between the switch and the first duplexer, and a second impedance matching circuit, electrically connected with a second electrical path between the switch and the second duplexer, and at least one processor, operatively coupled with the RFFE, wherein the at least one processor may be configured to, while both the first duplexer and the second duplexer are connected with the antenna via the switch, change a center frequency of the second filter in the first duplexer to a first frequency cutting off the sixth signal in portion of the downlink frequency range of the third frequency band partially overlapping the downlink frequency range of the second frequency band by using the first impedance matching circuitry or change a center frequency of the second filter in the second duplexer to a second frequency cutting off the fourth signal in portion of the downlink frequency range of the second frequency band partially overlapping the downlink frequency range of the third frequency band by using the second impedance matching circuitry.

According to an example embodiment, an electronic device may comprise an antenna, a radio frequency front end (RFFE) comprising, a switch, a first duplexer comprising a first filter passing a first signal in uplink frequency range of a first frequency band and a second filter passing a second signal in downlink frequency range of the first frequency band and a fourth signal in downlink frequency range of a second frequency band partially overlapping the downlink frequency range of the first frequency band and being connectable with the antenna via the switch, a second duplexer comprising a first filter passing a third signal in uplink frequency range of the second frequency band and a fifth signal in uplink frequency range of a third frequency band and a second filter passing a sixth signal in downlink frequency range of the third frequency band that is separate from the downlink frequency range of the first frequency band and partially overlaps the downlink frequency range of the second frequency band and being connectable with the antenna via the switch, a first impedance matching circuit, electrically connected with a second filter in the first duplexer from among the first filter in the first duplexer and the second filter in the first duplexer, and a second impedance matching circuit, electrically connected with a second filter in the second duplexer from among the first filter in the second duplexer and the second filter in the second duplexer, and at least one processor, operatively coupled with the RFFE, wherein the at least one processor may be configured to, while both the first duplexer and the second duplexer are connected with the antenna via the switch, change a characteristic of a filter from among the second filter in the first duplexer and the second filter in the second duplexer by using an impedance matching circuit from among the first impedance matching circuit and the second impedance matching circuit.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
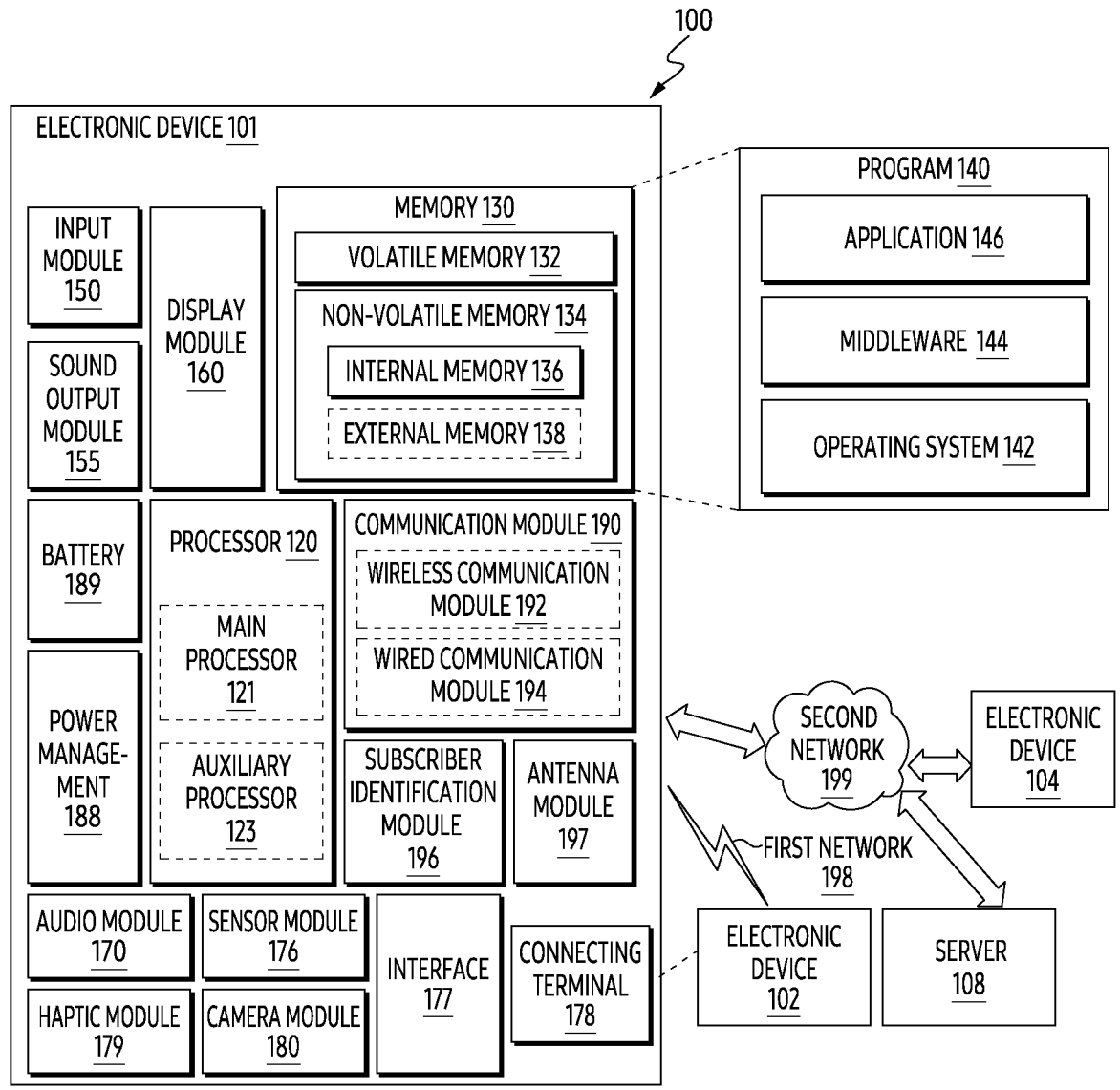
FIG. 1 is a block diagram of an electronic device in a network environment according to various example embodiments.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). Each "module" herein may include circuitry.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134 (which may include internal memory 136 and/or external memory 138). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121. Each processing unit herein preferably includes at least one processor. Each processor herein comprises processing circuitry.

The auxiliary processor 123 may control at least some of functions or states related to at least one component (e.g., the display module 160 including a display, the sensor module 176 including at least one sensor, or the communication module 190 including communication circuitry) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, and/or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
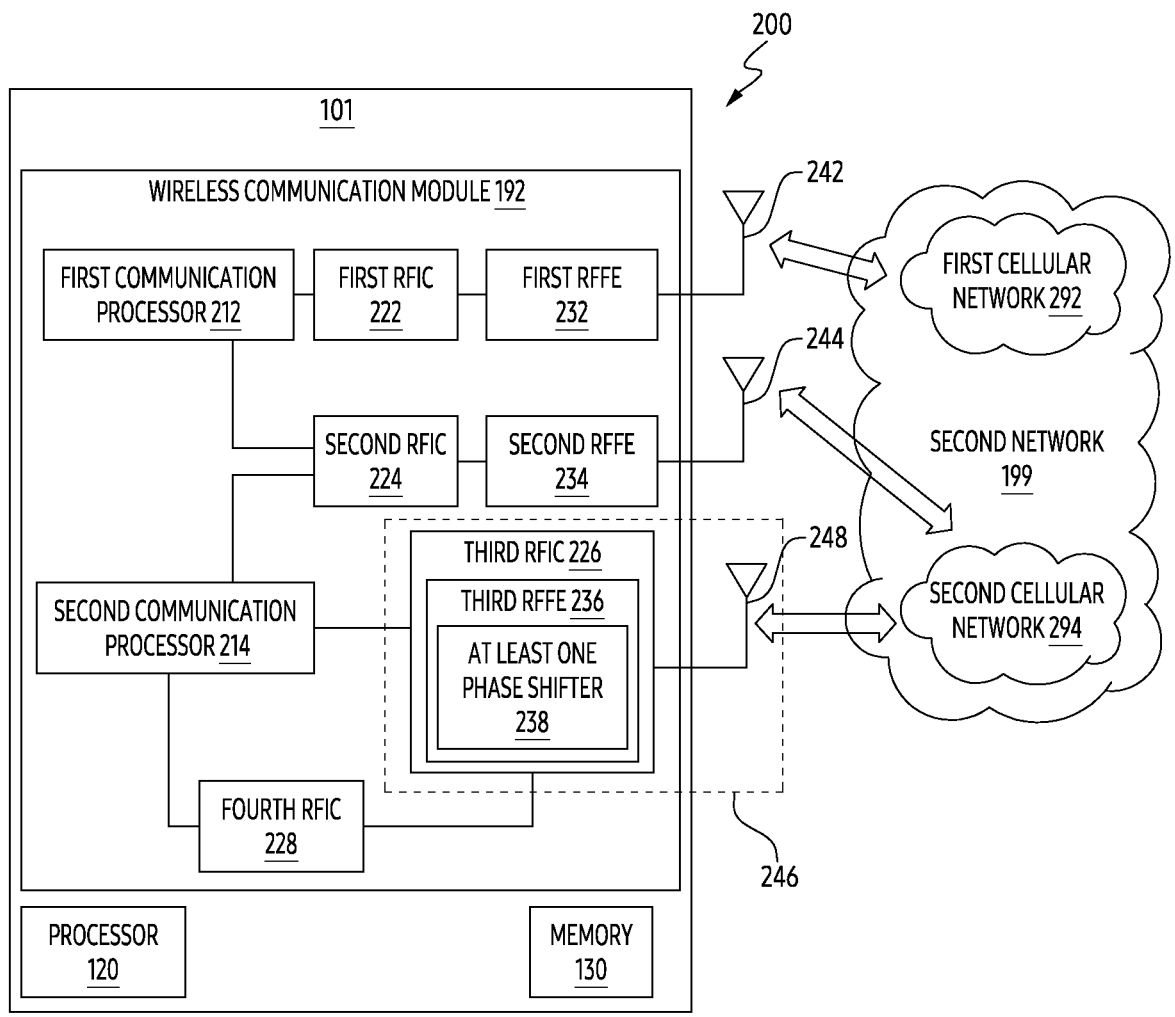
FIG. 2 is a block diagram of an electronic device for supporting legacy network communication and 5G network communication according to various example embodiments.

FIG. 2 is a block diagram 200 of the electronic device 101 for supporting legacy network communication and 5G network communication, according to various example embodiments. Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. Each antenna module herein (e.g., see 242, 244, and 246) includes an antenna. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192 (including communication circuitry). According to another embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel According to various embodiments, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel According to an embodiment, the first communication processor 212 and the second communication processor 214 may be implemented in a single chip or a single package. According to various embodiments, the first communication processor 212 or the second communication processor 214 may be formed with the processor 120, the auxiliary/coprocessor 123 of FIG. 1, or the communication module 190 (including communication circuitry) in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242, including at least one antenna), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244, including at least one antenna), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using at least one phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an example embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an example embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an example embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

An electronic device may transmit or receive a signal on each of a plurality of frequency bands. A first frequency band from among the plurality of frequency bands may partially overlap a second frequency band from among the plurality of frequency bands. Although the first frequency band and the second frequency band partially overlap each other, including a duplexer for each of the plurality of frequency bands in a radio frequency front end (RFFE) of the electronic device may cause an increase in the size of the RFFE.

The electronic device according to an example embodiment may reduce number of duplexers included in the RFFE by including a duplexer including a filter for passing a signal on the first frequency band and a signal on the second frequency band partially overlapping the first frequency band.

Figure 3:
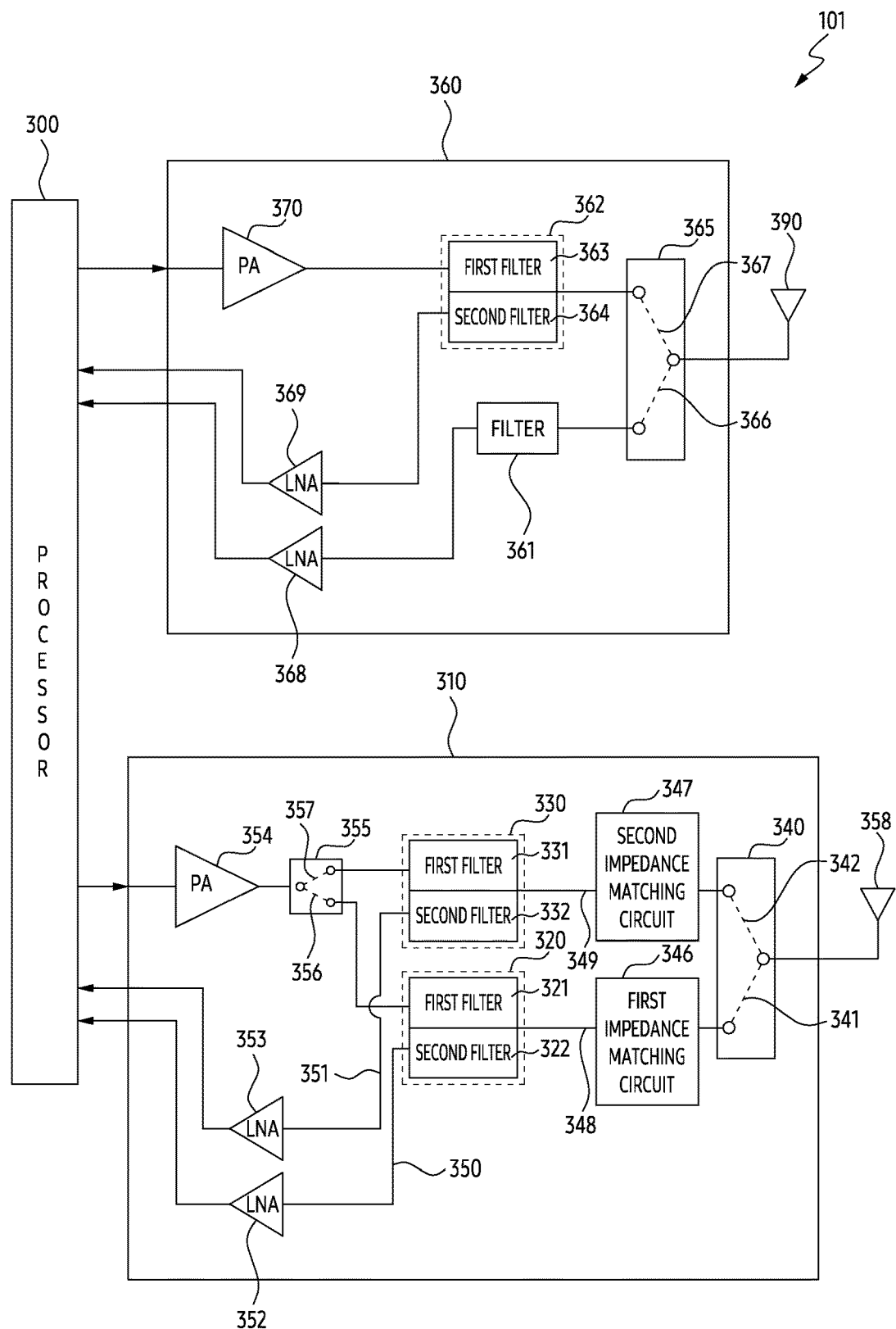
FIG. 3 is a simplified block diagram of an electronic device according to an example embodiment.

FIG. 3 is a simplified block diagram of an electronic device according to an example embodiment. Functional components indicated by the simplified block diagram may be included in the electronic device 101 illustrated in FIG. 1.

Figure 4:
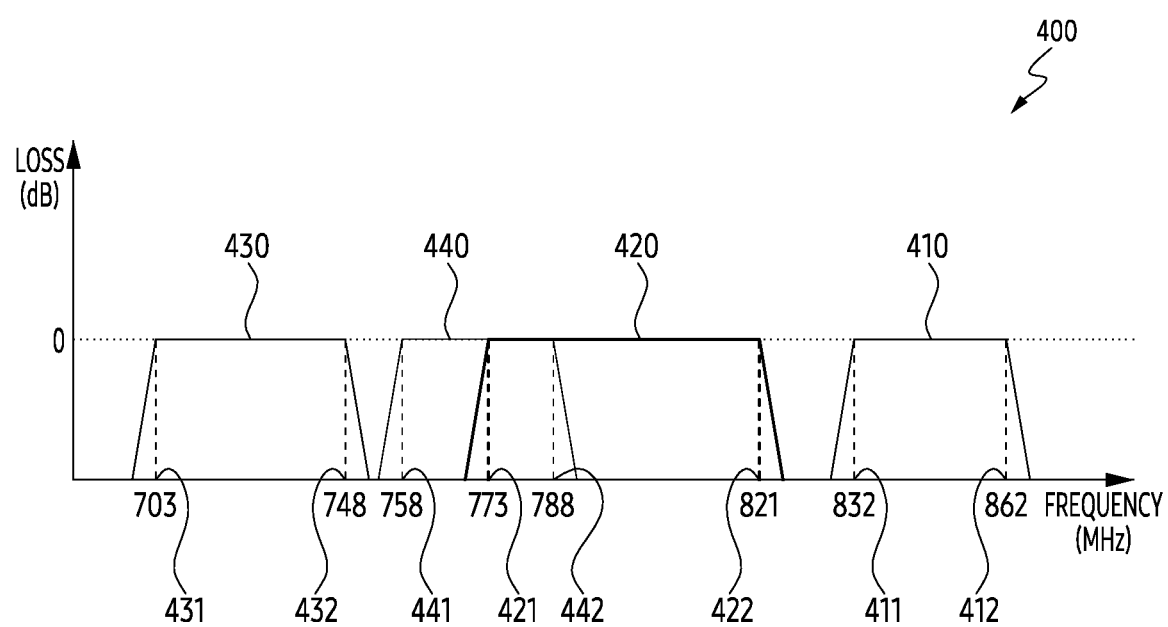
FIG. 4 is a graph illustrating a pass band of each of filters in duplexers in RFFE of an electronic device according to an example embodiment.

FIG. 4 is a graph illustrating a pass band of each of filters in duplexers in RFFE of an electronic device according to an example embodiment.

Figure 5A:
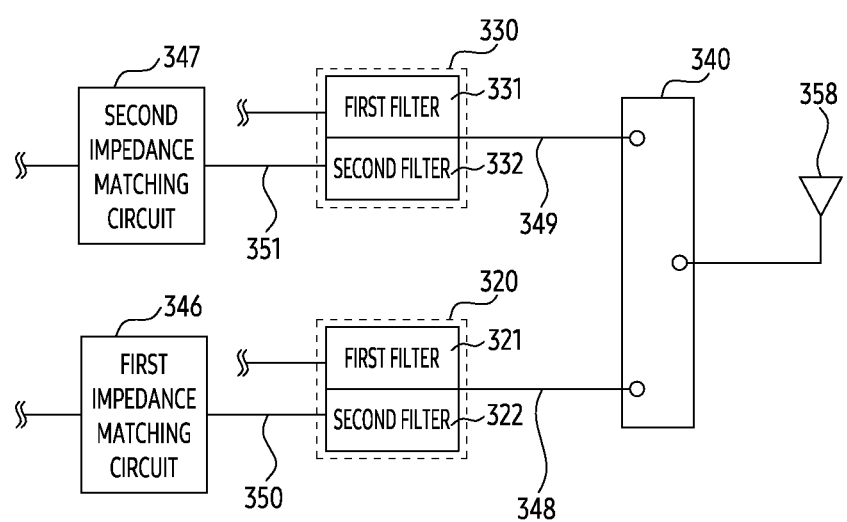
FIGS. 5A and 5B illustrate examples of a connection relationship between a filter in each of duplexers of a radio frequency front end (RFFE) of an electronic device and an impedance matching circuit of the RFFE according to an example embodiment.
Figure 5B:
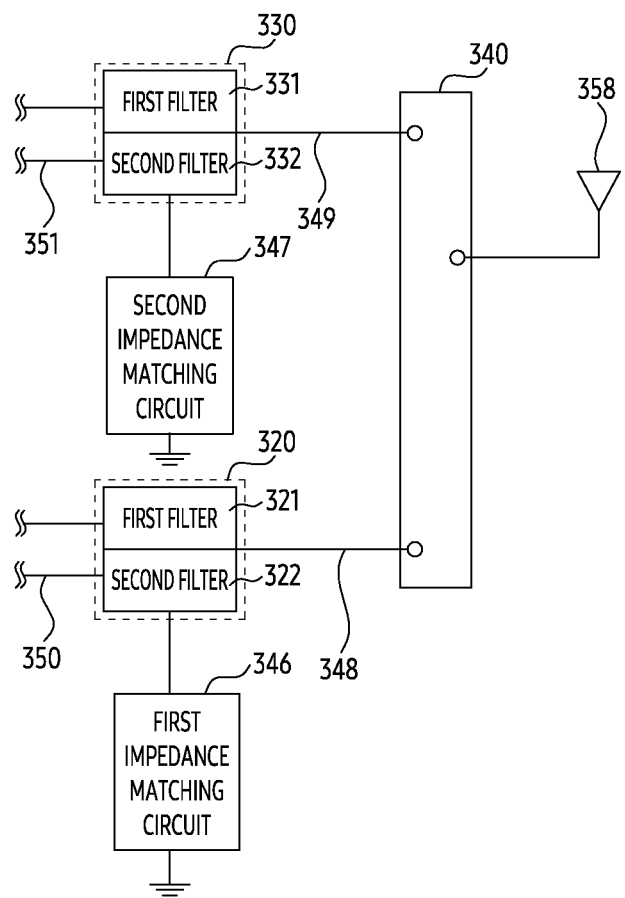

FIGS. 5A and 5B illustrate examples of a connection relationship between a filter in each of duplexers of a radio frequency front end (RFFE) of an electronic device and an impedance matching circuit of the RFFE according to an example embodiment.

Figure 6:
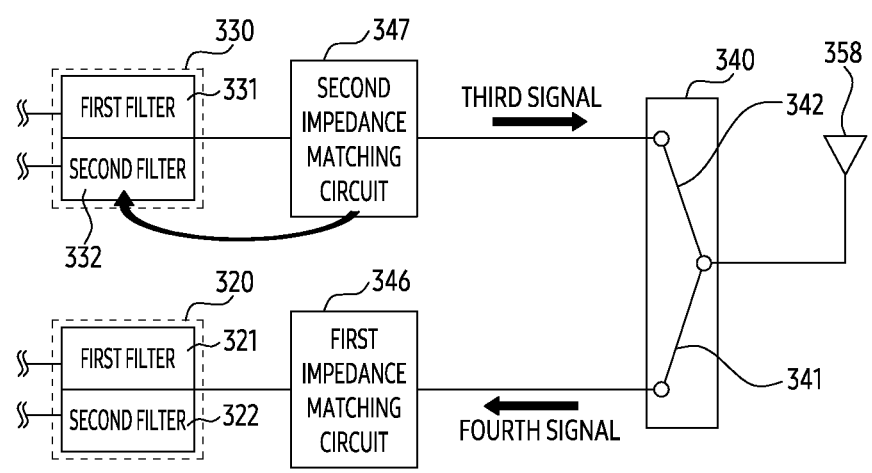
FIG. 6 illustrates an example of controlling an impedance matching circuit of an RFFE in an electronic device according to an example embodiment.

FIG. 6 illustrates an example of controlling an impedance matching circuit of an RFFE in an electronic device according to an example embodiment.

Figure 7:
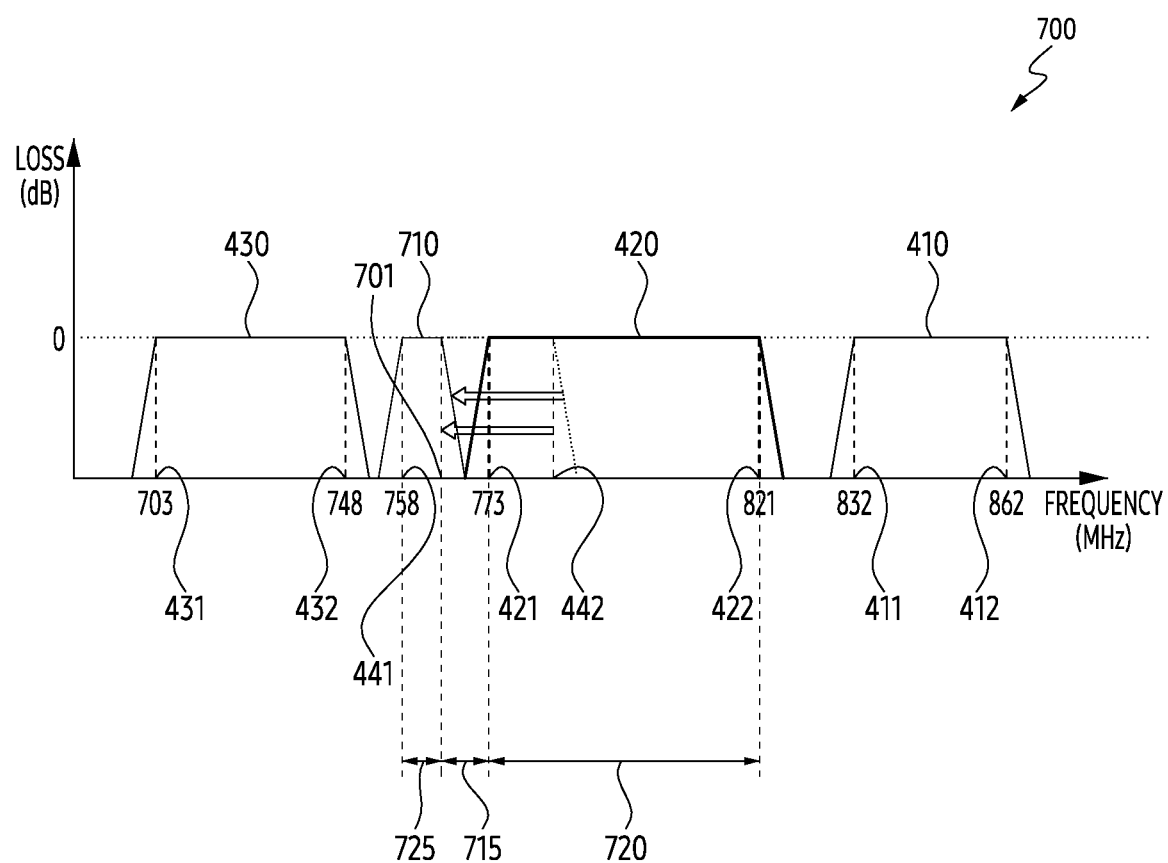
FIG. 7 is a graph illustrating a pass band of a filter changed based on control of an impedance matching circuit of an RFFE of an electronic device according to an example embodiment.

FIG. 7 is a graph illustrating a pass band of a filter changed based on control of an impedance matching circuit of an RFFE of an electronic device according to an example embodiment.

Figure 8:
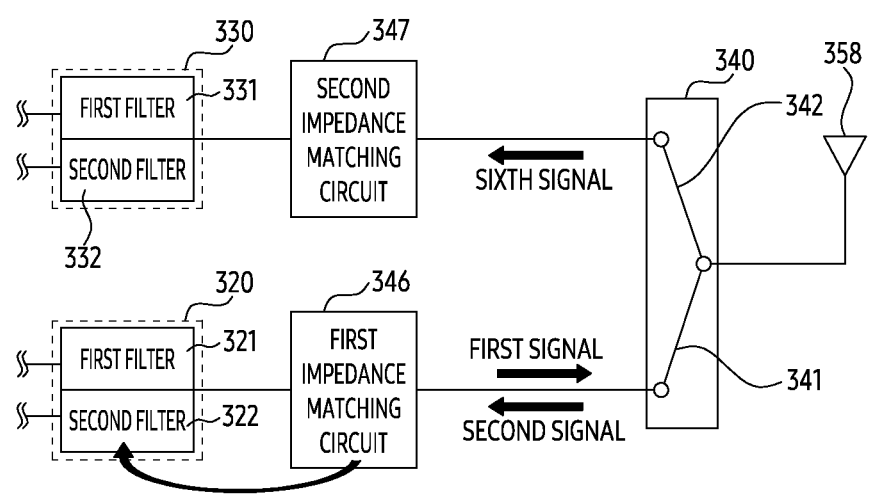
FIG. 8 illustrates an example of controlling another impedance matching circuit of RFFE in an electronic device according to an example embodiment.

FIG. 8 illustrates an example of controlling another impedance matching circuit of RFFE in an electronic device according to an example embodiment.

Figure 9:
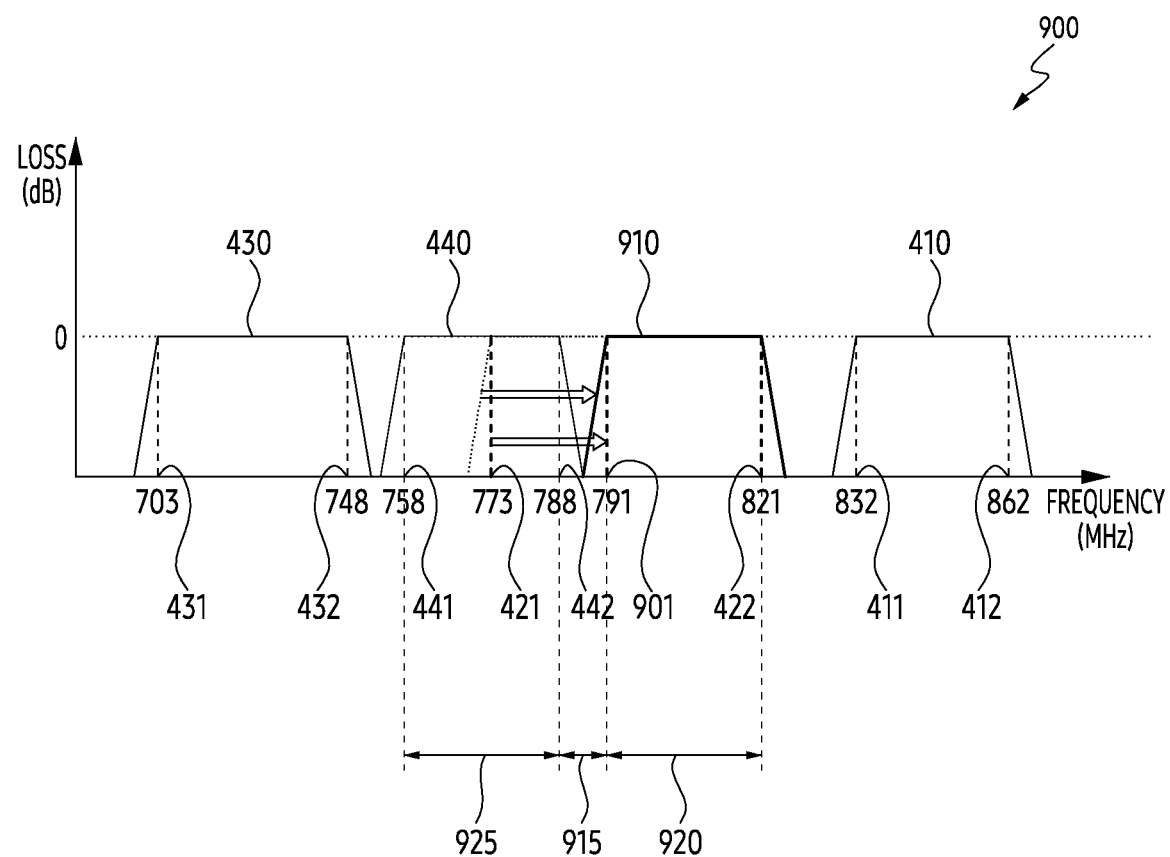
FIG. 9 is a graph illustrating a pass band of a filter changed based on control of another impedance matching circuit of RFFE in an electronic device according to an example embodiment.

FIG. 9 is a graph illustrating a pass band of a filter changed based on control of another impedance matching circuit of RFFE in an electronic device according to an example embodiment.

Figure 10:
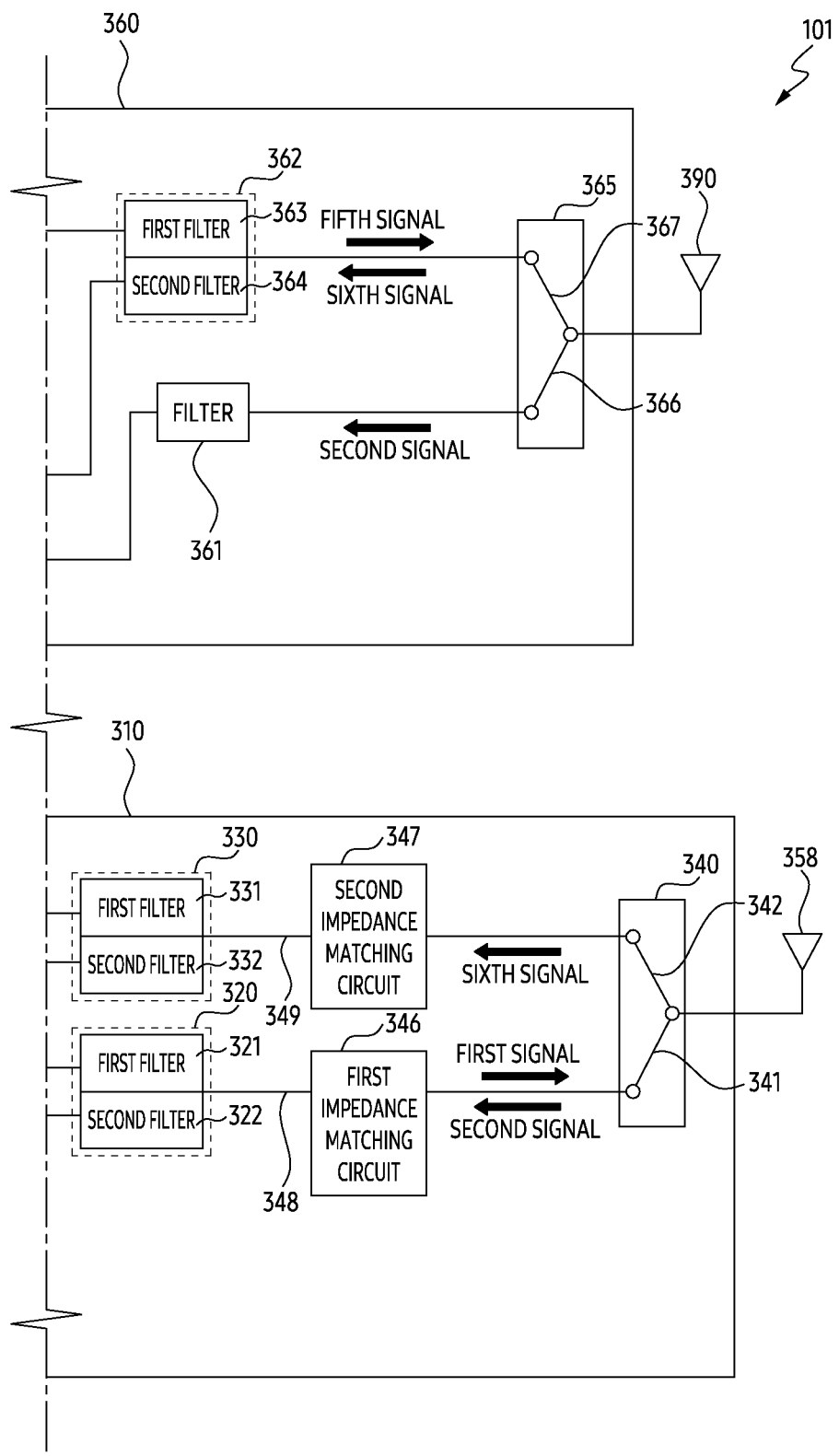
FIG. 10 illustrates an example of state of RFFEs in an electronic device when a signal is transmitted and received via an E-UTRA new radio dual connectivity (EN-DC) according to an example embodiment.

FIG. 10 illustrates an example of state of RFFEs in an electronic device when a signal is transmitted and received via an E-UTRA new radio dual connectivity (EN-DC) according to an example embodiment.

Figure 11:
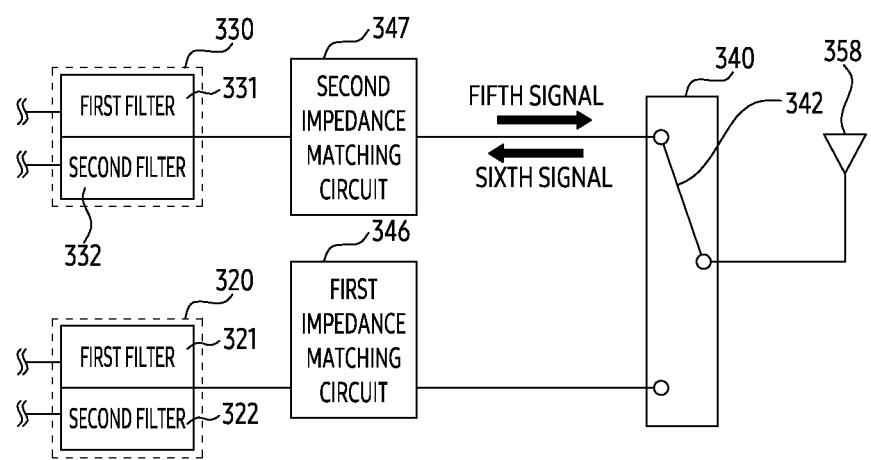
FIG. 11 illustrates an example of maintaining a pass band of each of filters in duplexers of RFFE of an electronic device according to an example embodiment.

FIG. 11 illustrates an example of maintaining a pass band of each of filters in duplexers of RFFE of an electronic device according to an example embodiment.

Figure 12:
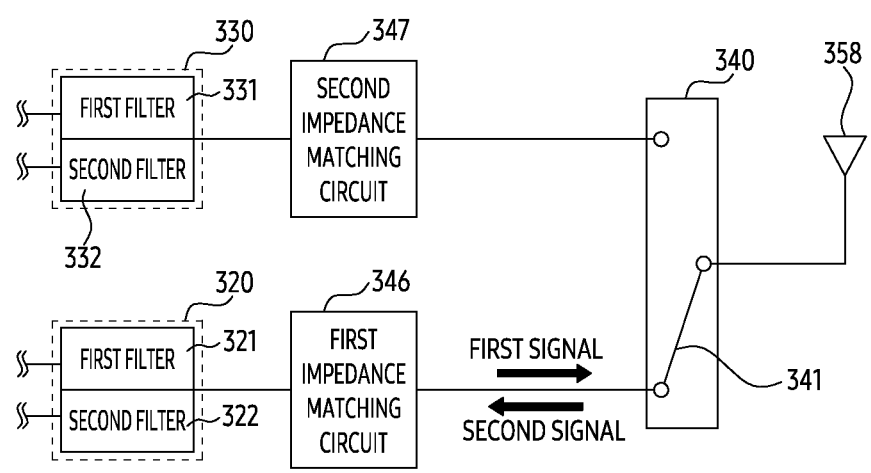
FIG. 12 illustrates another example of maintaining a pass band of each of filters in duplexers of RFFE of an electronic device according to an example embodiment.

FIG. 12 illustrates another example of maintaining a pass band of each of filters in duplexers of RFFE of an electronic device according to an example embodiment.

Referring to FIG. 3, an electronic device 101 may include a processor 300, a first RFFE 310, and a first antenna 358.

In an example embodiment, the processor 300 may include the processor 120 illustrated in FIG. 1. In an embodiment, the processor 300 may include at least one of the processor 120 illustrated in FIG. 2, the first communication processor 212, the second communication processor 214, the first RFIC 222, the second RFIC 224, the third RFIC 226, or the fourth RFIC 228.

In an example embodiment, the first RFFE 310 may be operatively coupled to the first antenna 358. In an embodiment, the first RFFE 310 may include a first duplexer 320 connectable to the first antenna 358 and a second duplexer 330 connectable to the first antenna 358.

For example, a first duplexer 320 may include a first filter 321 passing a first signal within a first frequency band (e.g., uplink frequency range (e.g., 832 megahertz (MHz) to 862 MHz) of B20 of LTE standard of 3GPP (3rd generation partnership project) or n20 of NR standard of 3GPP). For example, the uplink frequency range of the first frequency band may be referred to as a transmit frequency range of the first frequency band in terms of a frequency range of a signal transmitted from the electronic device 101.

For example, the first duplexer 320 may include a second filter 322 passing a second signal within a downlink frequency range (e.g., 791 MHz to 821 MHz) of the first frequency band and a fourth signal within a downlink frequency range (e.g., 773 MHz to 803 MHz) of a second frequency band (e.g., B28B of LTE standard of 3GPP or n28B of NR standard of 3GPP) partially overlapped with the downlink frequency range of the first frequency band. For example, when the downlink frequency range of the first frequency band is 791 MHz to 821 MHz, and the downlink frequency range of the second frequency band is 773 MHz to 803 MHz, the downlink frequency range of the first frequency band and the downlink frequency range of the second frequency band may overlap at 791 MHz to 803 MHz. For example, the downlink frequency range of the first frequency band and the downlink frequency range of the second frequency band may be referred to as a receive frequency range of the first frequency band and a receive frequency range of the second frequency band in terms of a frequency range of a signal received to the electronic device 101.

For example, a second duplexer 330 may include a first filter 331 (referred to as a third filter) passing a third signal within an uplink frequency range (e.g., 718 MHz to 748 MHz) of the second frequency band and a fifth signal within an uplink frequency range (e.g., 703 MHz to 733 MHz) of the third frequency band (e.g., B28A of LTE standard of 3GPP or n28A of NR standard of 3GPP). For example, the uplink frequency range of the second frequency band and the uplink frequency range of the third frequency band may be referred to as a transmit frequency range of the second frequency band and a transmit frequency range of the third frequency band in terms of a frequency range of signal transmitted from the electronic device 101.

For example, the second duplexer 330 may include a second filter 332 (possibly referred to as a fourth filter) passing a sixth signal within the downlink frequency range (e.g., 758 MHz to 788 MHz) of the third frequency band. For example, the downlink frequency range of the third frequency band may be separated from or spaced apart from the downlink frequency range of the first frequency band, different from the downlink frequency range of the second frequency band. For example, the downlink frequency range of the third frequency band may not overlap the downlink frequency range of the first frequency band, different from the downlink frequency range of the second frequency band. For example, the downlink frequency range of the third frequency band may partially overlap the downlink frequency range of the second frequency band. For example, since the downlink frequency range of the third frequency band partially overlaps the downlink frequency range of the second frequency band, the pass band of the second filter 322 may partially overlap the pass band of the second filter 332. For example, the downlink frequency range of the third frequency band may be referred to as a receive frequency range of the third frequency band in terms of a frequency range of a signal received to the electronic device 101.

According to an example embodiment, Since B28A of LTE standard and B28B of LTE standard are bands divided from B28 of LTE standard when the second frequency band is B28B of the LTE standard of the 3GPP (or N28B of NR standard of 3GPP) and the third frequency band is B28A of the LTE standard of the 3GPP (or N28A of NR standard of 3GPP), the second frequency band may be referred to as a portion of the frequency band, and the third frequency band may be referred to as another portion of the frequency band. However, it is not limited thereto.

In an example embodiment, since the pass band of the second filter 322 partially overlaps the pass band of the second filter 332, the guard band may not be formed or not provided between the pass band of the second filter 322 and the pass band of the second filter 332. For example, referring to FIG. 4, when the first frequency band is B20 of LTE standard of 3GPP (or n20 of NR standard of 3GPP), the second frequency band is B28B of LTE standard of 3GPP (or n28B of NR standard of 3GPP), and the third frequency band is B28A of LTE standard of 3GPP (or n28A of NR standard of 3GPP), a pass band of each of the first filter 321 in the first duplexer 320, the second filter 322 in the first duplexer 320, the first filter 331 in the second duplexer 330, and the second filter 332 in the second duplexer 330 may be expressed as a graph 400. A horizontal axis of the graph 400 is frequency (unit: MHz), a vertical axis of the graph 400 is loss and lines (e.g., line 410, line 420, line 430 and line 440) in the graph 400 represent a simplified pass band of the first filter 321, a simplified pass band of the second filter 322, a simplified pass band of the first filter 331, and a pass band of the second filter 332, respectively. For example, the loss may be represented by an S (scattering) parameter. For example, the S parameter may mean a ratio of an input voltage to an output voltage in a frequency distribution. For example, since each of the first duplexer 320 and the second duplexer 330 is a passive element, a maximum or high value of the S parameter in the graph 400 may be 0 decibel (dB). For example, as line 410, the first filter 321 may have a first cut-off frequency 411 that is 832 MHz and a second cut-off frequency 412 that is 862 MHz, and may pass the first signal having a frequency between the first cut-off frequency 411 and the second cut-off frequency 412. For example, as line 420, the second filter 322 may have a first cut-off frequency 421 that is 773 MHz and a second cut-off frequency 422 that is 821 MHz, and may pass the second signal and the fourth signal having a frequency between the first cut-off frequency 421 and the second cut-off frequency 422. For example, as line 430, the first filter 331 may have a first cut-off frequency 431 that is 703 MHz and a second cut-off frequency 432 that is 748 MHz, and may pass the third signal and the fifth signal having a frequency between the first cut-off frequency 431 and the second cut-off frequency 432. For example, as line 440, the second filter 332 may have a first cut-off frequency 441 that is 758 MHz and a second cut-off frequency 442 that is 788 MHz, and may pass the sixth signal having a frequency between the first cut-off frequency 441 and the second cut-off frequency 442. Since the first cut-off frequency 421 of the second filter 322 is a frequency lower than the second cut-off frequency 442 of the second filter 332, the guard band may not be formed or not provided between the pass band of the second filter 322 and the pass band of the second filter 332. Since the guard band may be not provided between the pass band of the second filter 322 and the pass band of the second filter 332, the processor 300 may change a characteristic of the second filter 322 on a first designated condition or change a characteristic of the second filter 332 on a second designated condition.

Referring back to FIG. 3, in an example embodiment, the first RFFE 310 may further include a switch 340. For example, the switch 340 may be controlled by the processor 300. For example, the processor 300 may connect the first duplexer 320 and the first antenna 358 via the switch 340, connect the second duplexer 330 and the first antenna 358, connect both the first duplexer 320 and the second duplexer 330 and the first antenna 358, or disconnect both the first duplexer 320 and the second duplexer 330 and the antenna 358. For example, based on the control of the processor 300, the switch 340 may have one state among a first state forming (or providing) a first electrical path 341 between the first duplexer 320 and the first antenna 358, a second state forming a second electrical path 342 between the second duplexer 330 and the first antenna 358, a third state forming both the first electrical path 341 and the second electrical path 342, and a fourth state not forming both the first electrical path 341 and the second electrical path 342.

In an example embodiment, the first RFFE 310 may further include a first impedance matching circuit 346 capable of changing or setting characteristic of the second filter 322 in the first duplexer 320 and a second impedance matching circuit 347 capable of changing or setting characteristic of the second filter 332 in the second duplexer 330.

For example, the first impedance matching circuit 346 may be controlled by the processor 300. For example, the processor 300 may change the characteristic of the second filter 322 by changing the cut-off frequency of the second filter 322 or changing the center frequency of the second filter 322 via the first impedance matching circuit 346. An example of changing the characteristic of the second filter 322 via the first impedance matching circuit 346 will be described later with reference to FIGS. 8 and 9.

For example, the second impedance matching circuit 347 may be controlled by the processor 300. For example, the processor 300 may change the characteristic of the second filter 332 by changing the cut-off frequency of the second filter 332 or changing the center frequency of the second filter 332 via the second impedance matching circuit 347. An example of changing the characteristic of the second filter 332 via the second impedance matching circuit 347 will be described later with reference to FIGS. 6 and 7.

In an example embodiment, each of the first impedance matching circuit 346 and the second impedance matching circuit 347 may include at least one of at least one variable capacitor or at least one inductor. In an embodiment, each of the first impedance matching circuit 346 and the second impedance matching circuit 347 may include at least one of at least one capacitor or at least one variable inductor. However, it is not limited thereto.

In an example embodiment, the first impedance matching circuit 346 may be electrically connected to the first electrical path 348 between the first duplexer 320 and the switch 340. For example, the first impedance matching circuit 346 may be electrically connected to the first duplexer 320 and electrically connected to the switch 340. In an embodiment, the second impedance matching circuit 347 may be electrically connected to the second electrical path 349 between the second duplexer 330 and the switch 340. For example, the second impedance matching circuit 347 may be electrically connected to the second duplexer 330 and electrically connected to the switch 340.

In an example embodiment, the first impedance matching circuit 346 may be electrically connected to the second filter 322 of the first filter 321 and the second filter 322, and the second impedance matching circuit 347 may be electrically connected to the second filter 332 of the first filter 331 and the second filter 332. For example, referring to FIG. 5A, the first impedance matching circuit 346 may be electrically connected to a third electrical path 350 extending to/from or formed from the second filter 322 of the first filter 321 and the second filter 322, instead of being electrically connected to the first electrical path 348 between the first duplexer 320 and the switch 340, to prevent or reduce a change in a characteristic of the first filter 321 from being caused by a change in a characteristic of the second filter 322 by the first impedance matching circuit 346 electrically connected to the first duplexer 320. Moreover, the first impedance matching circuit 346 electrically connected to the third electrical path 350 may be operatively coupled to a low noise amplifier (LNA) 352 illustrated in FIG. 3. The second impedance matching circuit 347 may be electrically connected to the fourth electrical path 351 extending to/from or formed from the second filter 332 of the first filter 331 and the second filter 332, instead of being electrically connected to the second electrical path 349 between the second duplexer 330 and the switch 340, to prevent or reduce a change in a characteristic of the first filter 331 from being caused by a change in a characteristic of the second filter 332 by the second impedance matching circuit 347 electrically connected to the second duplexer 330. The second impedance matching circuit 347 electrically connected to the fourth electrical path 351 may be operatively coupled to the LNA 353 illustrated in FIG. 3, for example. For another example, referring to FIG. 5B, the first impedance matching circuit 346 may be electrically connected to the second filter 322 of the first filter 321 and the second filter 322, instead of being electrically connected to the first electrical path 348 between the first duplexer 320 and the switch 340, to prevent or reduce a change in a characteristic of the first filter 321 from being caused by a change in a characteristic of the second filter 322 by the first impedance matching circuit 346 electrically connected to the first duplexer 320. For example, the first impedance matching circuit 346 illustrated in FIG. 5B may be electrically connected to the second filter 322 in parallel with the third electrical path 350. For example, the second impedance matching circuit 347 may be electrically connected to the second filter 332 of the first filter 331 and the second filter 332, instead of being electrically connected to the second electrical path 349 between the second duplexer 330 and the switch 340, to prevent or reduce a change in a characteristic of the first filter 331 from being caused by a change in a characteristic of the second filter 332 by the second impedance matching circuit 347 electrically connected to the second duplexer 330. For example, the second impedance matching circuit 347 illustrated in FIG. 5B may be electrically connected to the second filter 332 in parallel with the fourth electrical path 351.

Referring back to FIG. 3, in an embodiment, the first RFFE 310 may further include an LNA 352 configured to amplify the second signal, or the fourth signal received from the first antenna 358 through the second filter 322 in the first duplexer 320. The second signal or the fourth signal amplified by the LNA 352 may be provided to the processor 300.

In an embodiment, the first RFFE 310 may further include LNA 353 configured to amplify the sixth signal received from the first antenna 358 through the second filter 332 in the second duplexer 330. The sixth signal amplified by the LNA 353 may be provided to the processor 300.

In an example embodiment, the first RFFE 310 may further include a power amplifier (PA) 354 configured to amplify signals obtained from the processor 300. For example, the signals amplified by the PA 354 may be provided to the first filter 321 or the first filter 331. In an embodiment, the first filter 321 may be configured to pass the first signal among the amplified signals. In an embodiment, the first filter 331 may be configured to pass the third signal among the amplified signals. In an embodiment, the first filter 331 may be configured to pass the fifth signal among the amplified signals.

In an example embodiment, the first RFFE 310 may further include a switch 355 to provide the amplified signals to a filter among the first filter 321 and the first filter 331. The switch 355 may be controlled by the processor 300. For example, the processor 300 may connect the PA 354 and the first filter 321, connect the PA 354 and the first filter 331, or disconnect both the PA 354, the first filter 321, and the first filter 331 via the switch 355. For example, the switch 355 may have a first state (or providing) forming the first electrical path 356, a second state forming the second electrical path 357, and a third state disconnecting all of the first electrical path 356 and the second electrical path 357 based on the control of the processor 300.

In an example embodiment, the electronic device 101 may further include a second RFFE 360 and a second antenna 390 to support at least one of transmit diversity or receive diversity.

In an example embodiment, the second RFFE 360 may be operatively coupled to the second antenna 390. In an embodiment, the second RFFE 360 may include a filter 361 connectable to the second antenna 390 and a duplexer 362 connectable to the second antenna 390. For example, the filter 361 may pass the second signal. For example, the duplexer 362 may include a first filter 363 passing the fifth signal. For example, the duplexer 362 may include a second filter 364 passing the sixth signal.

In an example embodiment, the second RFFE 360 may further include a switch 365. For example, the switch 365 may be controlled by the processor 300. For example, the processor 300 may connect the filter 361 and the second antenna 390, connect the duplexer 362 and the second antenna 390, connect both the filter 361 and the duplexer 362 to the second antenna 390, or may disconnect both the filter 361 and the duplexer 362 and the second antenna 390 via the switch 365. For example, based on the control of the processor 300, the switch 365 may have one state from among a first state forming (or providing) a first electrical path 366 between the filter 261 and the second antenna 390, a second state forming a second electrical path 367 between the duplexer 362 and the second antenna 390, a third state forming both the first electrical path 366 and the second electrical path 367, and a fourth state not forming both the first electrical path 366 and the second electrical path 367.

In an example embodiment, the second RFFE 360 may further include an LNA 368 configured to amplify the second signal received from the second antenna 390 via the filter 361. The second signal amplified by the LNA 368 may be provided to the processor 300.

In an example embodiment, the second RFFE 360 may further include an LNA 369 configured to amplify the sixth signal received from the second antenna 390 via the second filter 364 in the duplexer 362. The sixth signal amplified by the LNA 369 may be provided to the processor 300.

In an example embodiment, the second RFFE 360 may further include a PA 370 configured to amplify signals obtained from the processor 300. For example, the signals amplified by the PA 370 may be provided to the first filter 363 in the duplexer 362. In an embodiment, the first filter 363 may be configured to pass the fifth signal from among the amplified signals.

In an example embodiment, on a condition that both the first duplexer 320 and the second duplexer 330 are connected to the first antenna 358, the processor 300 may change a characteristic of the second filter 322 in the first duplexer 320 or change a characteristic of the second filter 332 in the second duplexer 330.

For example, referring to FIG. 6, on the condition of transmitting the third signal and receiving the fourth signal, the processor 300 may connect the first antenna 358 to both the first duplexer 320 and the second duplexer 330 by setting the state of the switch 340 to the third state providing both the first electrical path 341 and the second electrical path 342, respectively. For example, since the pass band of the second filter 322 in the first duplexer 320 connected to the first antenna 358 partially overlaps the pass band of the second filter 332 in the second duplexer 330 connected to the first antenna 358 while the state of the switch 340 is in the third state, the processor 300 may change the characteristic of the second filter 332 that is not used to receive the fourth signal. For example, the processor 300 may change a cut-off frequency (or a center frequency) of the second filter 332 to block or refrain from receiving the fourth signal via the second filter 332. For example, the processor 300 may change the cut-off frequency (or center frequency) of the second filter 332 to a frequency that blocks the fourth signal within a portion of the downlink frequency range of the second frequency band partially overlapped with the downlink frequency range of the third frequency band, via the second impedance matching circuit 347. For example, referring to FIG. 7, when the first frequency band is B20 of LTE standard of 3GPP (or n20 of NR standard of 3GPP), the second frequency band is B28B of LTE standard of 3GPP (or n28B of NR standard of 3GPP), and the third frequency band is B28A of LTE standard of 3GPP (or n28A of NR standard of 3GPP), while transmitting the third signal and receiving the fourth signal, a pass band of each of the first filter 321 in the first duplexer 320, the second filter 322 in the first duplexer 320, the first filter 331 in the second duplexer 330, and the second filter 332 in the second duplexer 330 may be expressed as a graph 700. A horizontal axis of the graph 700 is frequency (unit: MHz), a vertical axis of the graph 400 is loss and lines (e.g., line 410, line 420, line 430 and line 710) in the graph 700 represent a simplified pass band of the first filter 321, a simplified pass band of the second filter 322, a simplified pass band of the first filter 331, and a pass band of the second filter 332, respectively. For example, the loss may be represented by an S (scattering) parameter. For example, the S parameter may mean a ratio of an input voltage to an output voltage in a frequency distribution. For example, since each of the first duplexer 320 and the second duplexer 330 is a passive element, a maximum or high value of the S parameter in the graph 700 may be 0 dB. For example, on a condition of transmitting the third signal and receiving the fourth signal, the processor 300 may change the second cut-off frequency 442 of the second filter 332 to the second cut-off frequency 701. Since the pass band of the second filter 332 defined by the first cut-off frequency 441 and the second cut-off frequency 701 does not overlap the downlink frequency range of the second frequency band, the processor 300 may block or refrain from receiving the fourth signal via the second filter 332 by changing the characteristic of the second filter 332. For example, different from FIG. 4, since the guard band 715 is defined or formed between the pass band 720 of the second filter 322 defined by the first cut-off frequency 421 and the second cut-off frequency 422 and the pass band 725 of the second filter 332 defined by the first cut-off frequency 441 and the second cut-off frequency 701, the processor 300 may block receiving the fourth signal through the second filter 332 and receive the fourth signal through the second filter 322.

For another example, referring to FIG. 8, on the condition of transmitting the first signal via the first RFFE 310, receiving the second signal, and receiving the sixth signal, the processor 300 may connect the first antenna 358 to both the first duplexer 320 and the second duplexer 330, by setting the state of the switch 340 to the third state providing both a first electrical path 341 and a second electrical path 342, respectively. For example, the processor 300 may set the state of the switch 340 to the third state, to transmit the first signal and the fifth signal (not illustrated in FIG. 8, illustrated in FIG. 10) through carrier aggregation (CA) and to receive the second signal and the sixth signal. For example, the processor 300 may set the state of the switch 340 to the third state to transmit the first signal and the fifth signal (not illustrated in FIG. 8, illustrated in FIG. 10) and receive the second signal and the sixth signal via an E-UTRA new radio dual connectivity (EN-DC) of NR standard of 3GPP. For example, since the pass band of the second filter 322 in the first duplexer 320 connected to the first antenna 358 partially overlaps the pass band of the second filter 332 in the second duplexer 330 connected to the first antenna 358 while the state of the switch 340 is in the third state, the processor 300 may change the characteristic of the second filter 322 which is used to receive the second signal from among the second signal and the fourth signal and is not used to receive the sixth signal. For example, the processor 300 may change a cut-off frequency (or a center frequency) of the second filter 322 to block or refrain from receiving the sixth signal via the second filter 322. For example, the processor 300 may change the cut-off frequency of the second filter 322 to a frequency that blocks the sixth signal within a portion of the downlink frequency range of the third frequency band partially overlapped with the downlink frequency range of the second frequency band via the first impedance matching circuit 346. For example, referring to FIG. 9, when the first frequency band is B20 of LTE standard of 3GPP (or n20 of NR standard of 3GPP), the second frequency band is B28B of LTE standard of 3GPP (or n28B of NR standard of 3GPP), and the third frequency band is n28A of NR standard of 3GPP (or B28A of LTE standard of 3GPP), a pass band of each of the first filter 321 in the first duplexer 320, the second filter 322 in the first duplexer 320, the first filter 331 in the second duplexer 330 and the second filter 332 in the second duplexer 330 may be expressed while transmitting the first signal, receiving the second signal, and receiving the sixth signal, as a graph 900. A horizontal axis of the graph 900 is frequency (unit: MHz), a vertical axis of the graph 900 is loss and lines (e.g., line 410, line 430, line 440, and line 910) in the graph 900 represent a simplified pass band of the first filter 321, a simplified pass band of the second filter 322, a simplified pass band of the first filter 331, and a pass band of the second filter 332, respectively. For example, the loss may be represented by an S (scattering) parameter. For example, the S parameter may mean a ratio of an input voltage to an output voltage in a frequency distribution. For example, since each of the first duplexer 320 and the second duplexer 330 is a passive element, a maximum or high value of the S parameter in the graph 900 may be 0 dB. For example, on the condition of transmitting the first signal, receiving the second signal, and receiving the sixth signal, the processor 300 may change the first cut-off frequency 421 of the second filter 322 to the first cut-off frequency 901. Since a pass band of the second filter 322 defined as the first cut-off frequency 901 and the second cut-off frequency 422 includes the downlink frequency range of the first frequency band and a pass band of the second filter 322 defined as the first cut-off frequency 901 and the second cut-off frequency 422 does not overlap the downlink frequency range of the third frequency band, the processor 300 may receive the second signal through the second filter 322 via a change in a characteristic of the second filter 322, and may block or refrain from receiving the sixth signal through the second filter 322 via the change in the characteristic of the second filter 322. For example, since the guard band 915 is defined or formed between the pass band 920 of the second filter 322 defined by the first cut-off frequency 901 and the second cut-off frequency 422 and the pass band 925 of the second filter 332 defined by the first cut-off frequency 441 and the second cut-off frequency 442, the processor 300 may block receiving the sixth signal via the second filter 322 and receive the sixth signal via the second filter 332, different from FIG. 4. Each processor herein comprises processing circuitry.

Referring back to FIG. 3, in an embodiment, the processor 300 may transmit the first signal and the fifth signal via CA or EN-DC and receive the second signal and the sixth signal by using both the first RFFE 310 and the second RFFE 360. For example, referring to FIG. 10, The processor 300 may transmit the first signal, receive the second signal, and receive the sixth signal via the first RFFE 310, by connecting the first duplexer 320 and the first antenna 358 and connecting the second duplexer 330 and the first antenna 358, based on setting the state of the switch 340 to the third state providing both the first electrical path 341 and the second electrical path 342. For example, the cut-off frequency (or center frequency) of the second filter 322 may be changed via the first impedance matching circuit 346 to prevent or reduce the sixth signal from passing through the second filter 322. For example, the processor 300 may use the first antenna 358 as a transmission/reception path for the first frequency band through the first RFFE 310 and the first antenna 358 as a diversity reception path for the third frequency band. For example, the processor 300 may transmit the fifth signal, receive the second signal, and receive the sixth signal by connecting the filter 361 and the second antenna 390 and connecting the duplexer 362 and the second antenna 390, based on setting the state of the switch 365 to the third state providing both the first electrical path 366 and the second electrical path 367 while setting the state of the switch 340 to the third state, via the second RFFE 360. For example, the processor 300 may use the second antenna 390 as a diversity reception path for the first frequency band via the second RFFE 360, and may use the second antenna 390 as a transmission/reception path for the third frequency band.

Referring back to FIG. 3, in an example embodiment, on a condition that a duplexer among the first duplexer 320 and the second duplexer 330 is connected to the first antenna 358, the processor 300 may maintain the characteristic of the second filter 322 in the first duplexer 320 and the second filter 332 in the second duplexer 330.

For example, referring to FIG. 11, on the condition of transmitting the fifth signal and receiving the sixth signal, the processor 300 may connect the first antenna 358 to the second duplexer 330 by setting the state of the switch 340 to the second state providing the second electrical path 342. For example, since the first antenna 358 is disconnected from the first duplexer 320 while the state of the switch 340 is in the second state, the processor 300 may maintain the characteristic of the second filter 332. For example, while the state of the switch 340 is in the second state, the processor 300 may maintain the characteristic of the second filter 332 by maintaining cut-off frequencies (or center frequencies) of the second filter 332 so that the pass band corresponds to the downlink frequency range of the third frequency band. For example, referring to FIG. 4, when the first frequency band is B20 of LTE standard of 3GPP (or n20 of NR standard of 3GPP), the second frequency band is B28B of LTE standard of 3GPP (or n28B of NR standard of 3GPP), and the third frequency band is B28A of LTE standard of 3GPP (or n28A of NR standard of 3GPP), the processor 300 may set the pass band of the first filter 331 so that the pass band of the first filter 331 is expressed as a line 430 via the second impedance matching circuit 347, and set the pass band of the second filter 332 so that the pass band of the second filter 332 is expressed as a line 440.

For another example, referring to FIG. 12, on the condition of transmitting the first signal and receiving the second signal, the processor 300 may connect the first antenna 358 to the first duplexer 320 by setting the state of the switch 340 to the first state providing the first electrical path 341. For example, while the state of the switch 340 is in the first state, since the first antenna 358 is disconnected from the second duplexer 330, the processor 300 may maintain the characteristic of the first filter 322. For example, while the state of the switch 340 is in the first state, the processor 300 may maintain characteristic of the second filter 322 by maintaining cut-off frequencies (or center frequencies) of the second filter 322 so that the pass band of the second filter 322 corresponds to the second frequency band. For example, referring to FIG. 4, when the first frequency band is B20 of LTE standard of 3GPP (or n20 of NR standard of 3GPP), the second frequency band is B28B of LTE standard of 3GPP (or n28B of NR standard of 3GPP), and the third frequency band is B28A of LTE standard of 3GPP (or n28A of NR standard of 3GPP), the processor 300 may set the pass band of the first filter 321 so that the pass band of the first filter 321 is expressed as a line 410 via the first impedance matching circuit 346, and set the pass band of the second filter 322 so that the pass band of the second filter 322 is expressed as a line 420.

As described above, the electronic device 101 may include a filter (e.g., a second filter 322) passing all signals on frequency ranges (e.g., the downlink frequency range of the first frequency band and the downlink frequency range of the second frequency band) overlapping each other. The electronic device 101 may include RFFE (e.g., a first RFFE 310) having a size smaller than that of the RFFE of the electronic device having a filter for each of the frequency ranges by including the filter. Since the electronic device 101 includes the RFFE having a reduced size, a space for mounting the components of the electronic device 101 may be provided more widely.

In an example embodiment, the electronic device 101 may change the characteristic of the filter or another filter to prevent or reduce unintended signals from being received through the filter or another filter distinguished from the filter according to a transmission/reception state of a signal by including the filter. For example, the electronic device 101 may include an impedance matching circuit (e.g., the first impedance matching circuit 346 or the second impedance matching circuit 347) to change the characteristic of the filter or the characteristic of another filter.

The above-described descriptions describe an example of changing a characteristic of a filter in each of the duplexers used for receiving a signal when two or more duplexers are respectively connected to one antenna, but this is for convenience of description. The above descriptions may be used to change characteristic of filters in each of the duplexers used for transmitting signals when two or more duplexers are respectively connected to one antenna.

The electronic device according to an example embodiment can reduce a size of a radio frequency front end (RFFE) including a duplexer by including a duplexer including a filter for passing a signal on a first frequency band and a signal on a second frequency band partially overlapping the first frequency band, and a circuit for adaptively changing a characteristic of the filter.

As described above, according to an example embodiment, an electronic device (e.g., electronic device 101) may comprise an antenna (e.g., first antenna 358), a radio frequency front end (RFFE) (e.g., first RFFE 310) comprising a first duplexer (e.g., first duplexer 320) comprising a first filter (e.g., first filter 321) passing a first signal in uplink frequency range of a first frequency band and a second filter (e.g., second filter 322) passing a second signal in downlink frequency range of the first frequency band and a fourth signal in downlink frequency range of a second frequency band partially overlapping the downlink frequency range of the first frequency band and a second duplexer (e.g., second duplexer 330) comprising a first filter (e.g., first filter 331) passing a third signal in uplink frequency range of the second frequency band and a fifth signal in uplink frequency range of a third frequency band and a second filter (e.g., second filter 332) passing a sixth signal in downlink frequency range of the third frequency band that is separate from the downlink frequency range of the first frequency band and partially overlaps the downlink frequency range of the second frequency band, and at least one processor (e.g., processor 300), operatively coupled with the RFFE; wherein the at least one processor may be configured to, while both the first duplexer and the second duplexer are electrically connected with the antenna, change a cut-off frequency of the second filter in the first duplexer to a first frequency cutting off the sixth signal in portion of the downlink frequency range of the third frequency band partially overlapping the downlink frequency range of the second frequency band or change a cut-off frequency of the second filter in the second duplexer to a second frequency cutting off the fourth signal in portion of the downlink frequency range of the second frequency band partially overlapping the downlink frequency range of the third frequency band. Any embodiment herein may be used with, or without, any other embodiment herein.

In an example embodiment, the at least one processor may be configured to, while transmitting the third signal and receiving the fourth signal via the antenna electrically connected with both the first duplexer and the second duplexer, change the cut-off frequency of the second filter in the second duplexer to the second frequency; and while transmitting the first signal and receiving the second signal and the sixth signal via the antenna electrically connected with both the first duplexer and the second duplexer, change the cut-off frequency of the second filter in the first duplexer to the first frequency.

In an example embodiment, the at least one processor is further configured to, while the first duplexer from among the first duplexer and the second duplexer is electrically connected with the antenna, maintain the cut-off frequency of the second filter in the first duplexer as a third frequency passing both the second signal in the downlink frequency range of the first frequency band and the fourth signal in the downlink frequency range of the second frequency band; and while the second duplexer from among the first duplexer and the second duplexer is electrically connected with the antenna, maintain the cut-off frequency of the second filter in the second duplexer as a fourth frequency passing the sixth signal in the downlink frequency range of the third frequency band. In an embodiment, the at least one processor may be configured to, while transmitting the first signal and receiving the second signal via the antenna electrically connected with the first duplexer from among the first duplexer and the second duplexer, maintain the cut-off frequency of the second filter in the first duplexer as the third frequency; and while transmitting the fifth signal and receiving the sixth signal via the antenna electrically connected with the second duplexer from among the first duplexer and the second duplexer, maintain the cut-off frequency of the second filter in the second duplexer as the fourth frequency.

In an example embodiment, the RFFE further may comprise a switch (e.g., switch 340), wherein the first duplexer may be connectable with the antenna via the switch, wherein the second duplexer may be connectable with the antenna via the switch, and wherein the at least one processor may be configured to change, while controlling the switch to electrically connect both the first duplexer and the second duplexer with the antenna, the cut-off frequency of the second filter in the first duplexer to the first frequency or the cut-off frequency of the second filter in the second duplexer to the second frequency. In an embodiment, the at least one processor may be further configured to, while controlling the switch to electrically connect the first duplexer from among the first duplexer and the second duplexer with the antenna, maintain the cut-off frequency of the second filter in the first duplexer as a third frequency passing both the second signal in the downlink frequency range of the first frequency band and the fourth signal in the downlink frequency range of the second frequency band; and while controlling the switch to electrically connect the second duplexer from among the first duplexer and the second duplexer with the antenna, maintain the cut-off frequency of the second filter in the second duplexer as a fourth frequency passing the sixth signal in the downlink frequency range of the third frequency band.

In an example embodiment, the RFFE may further comprise a first impedance matching circuitry (e.g., first impedance matching circuit 346 illustrated in FIG. 3), electrically connected with the first duplexer, electrically connected with the switch; and a second impedance matching circuitry (e.g., second impedance matching circuit 347 illustrated in FIG. 3), electrically connected with the second duplexer, electrically connected with the switch, and wherein the at least one processor may be configured to, while controlling the switch to electrically connect both the first duplexer and the second duplexer with the antenna, change the cut-off frequency of the second filter in the first duplexer to the first frequency by using the first impedance matching circuitry or change the cut-off frequency of the second filter in the second duplexer to the second frequency by using the second impedance matching circuitry.

In an example embodiment, the RFFE may further comprise a first impedance matching circuitry (e.g., first impedance matching circuit 346 illustrated in FIG. 5) electrically connected with the second filter in the first duplexer; and a second impedance matching circuitry (e.g., second impedance matching circuit 347 illustrated in FIG. 5) electrically connected with the second filter in the second duplexer, and wherein the at least one processor may be configured to, while controlling the switch to electrically connect both the first duplexer and the second duplexer with the antenna, change the cut-off frequency of the second filter in the first duplexer to the first frequency by using the first impedance matching circuitry or change the cut-off frequency of the second filter in the second duplexer to the second frequency by using the second impedance matching circuitry.

In an example embodiment, the antenna may be a first antenna; wherein the electronic device may further comprise a second antenna (e.g., second antenna 390), and another RFFE (e.g., second RFFE 360), operatively coupled with the at least one processor, comprising a duplexer (e.g., duplexer 362) comprising a first filter passing the fifth signal and a second filter passing the sixth signal and a filter (e.g., filter 361) passing the second signal, and; wherein the at least one processor may be further configured to change the cut-off frequency of the second filter in the first duplexer, while transmitting the first signal and receiving the second signal and the sixth signal via the first antenna electrically connected with both the first duplexer and the second duplexer, to the second frequency; and transmit the fifth signal and receive the second signal and the sixth signal via the second antenna electrically connected with both the duplexer and the filter in the other RFFE, while transmitting the first signal and receiving the second signal and the sixth signal via the first antenna electrically connected with both the first duplexer and the second duplexer.

In an example embodiment, the uplink frequency range of the first frequency band, the uplink frequency range of the second frequency band, and the uplink frequency range of the third frequency band may be separated from each other.

In an example embodiment, an electronic device (e.g., electronic device 101) may comprise an antenna (e.g., first antenna 358), a radio frequency front end (RFFE)(e.g., first RFFE 310) comprising a switch (e.g., switch 340), a first duplexer (e.g., first duplexer 320) comprising a first filter (e.g., first filter 321) passing a first signal in uplink frequency range of a first frequency band and a second filter (e.g., second filter 322) passing a second signal in downlink frequency range of the first frequency band and a fourth signal in downlink frequency range of a second frequency band partially overlapping the downlink frequency range of the first frequency band and being connectable with the antenna via the switch, a second duplexer (e.g., second duplexer 330) comprising a first filter (e.g., first filter 331) passing a third signal in uplink frequency range of the second frequency band and a fifth signal in uplink frequency range of a third frequency band and a second filter (e.g., second filter 332) passing a sixth signal in downlink frequency range of the third frequency band that is separate from the downlink frequency range of the first frequency band and partially overlaps the downlink frequency range of the second frequency band and being connectable with the antenna via the switch, a first impedance matching circuit (e.g., first impedance matching circuit 346), electrically connected with a first electrical path between the switch and the first duplexer, and a second impedance matching circuit (e.g., second impedance matching circuit 347), electrically connected with a second electrical path between the switch and the second duplexer, and at least one processor (e.g., processor 300), operatively coupled with the RFFE, wherein the at least one processor may be configured to, while both the first duplexer and the second duplexer are connected with the antenna via the switch, change a center frequency of the second filter in the first duplexer to a first frequency cutting off the sixth signal in portion of the downlink frequency range of the third frequency band partially overlapping the downlink frequency range of the second frequency band by using the first impedance matching circuitry or change a center frequency of the second filter in the second duplexer to a second frequency cutting off the fourth signal in portion of the downlink frequency range of the second frequency band partially overlapping the downlink frequency range of the third frequency band by using the second impedance matching circuitry.

In an example embodiment, the at least one processor may be configured to, while transmitting the first signal and receiving the second signal and the sixth signal via the antenna electrically connected with both the first duplexer and the second duplexer via the switch, change the center frequency of the second filter in the first duplexer to the first frequency by using the first impedance matching circuit from among the first impedance matching circuit and the second impedance matching circuit; and while transmitting the third signal and receiving the fourth signal via the antenna electrically connected with both the first duplexer and the second duplexer via the switch, change the center frequency of the second filter in the second duplexer to the second frequency by using the second impedance matching circuit from among the first impedance matching circuit and the second impedance matching circuit.

In an example embodiment, the at least one processor may be configured to, while the first duplexer from among the first duplexer and the second duplexer is electrically connected with the antenna via the switch, maintain the center frequency of the second filter in the first duplexer as a third frequency passing both the second signal in the downlink frequency range of the first frequency band and the fourth signal in the downlink frequency range of the second frequency band by using the first impedance matching circuit; and while the second duplexer from among the first duplexer and the second duplexer is electrically connected with the antenna via the switch, maintain the center frequency of the second filter in the second duplexer as a fourth frequency passing the sixth signal in the downlink frequency range of the third frequency band by using the second impedance matching circuit. In an embodiment, the at least one processor may be configured to, while transmitting the first signal and receiving the second signal via the antenna electrically connected with the first duplexer from among the first duplexer and the second duplexer via the switch, maintain the center frequency of the second filter in the first duplexer as the third frequency by using the first impedance matching circuit; and while transmitting the fifth signal and receiving the sixth signal via the antenna electrically connected with the second duplexer from among the first duplexer and the second duplexer via the switch, maintain the center frequency of the second filter in the second duplexer as the fourth frequency by using the second impedance matching circuit.

In an example embodiment, the antenna may be a first antenna; wherein the electronic device may further comprise a second antenna (e.g., second antenna 390) and another RFFE (e.g., second RFFE 360), operatively coupled with the at least one processor, comprising another switch (e.g., switch 365), a duplexer (e.g., duplexer 362) comprising a first filter passing the fifth signal and a second filter passing the sixth signal, and a filter (e.g., filter 361) passing the second signal, and wherein the at least one processor may be further configured to change the center frequency of the second filter in the first duplexer, while transmitting the first signal and receiving the second signal and the sixth signal via the first antenna electrically connected with both the first duplexer and the second duplexer via the switch, to the first frequency by using the first impedance matching circuit; and transmit the fifth signal and receive the second signal and the sixth signal via the second antenna electrically connected with both the duplexer and the filter in the other RFFE via the another switch, while transmitting the first signal and receiving the second signal and the sixth signal via the first antenna electrically connected with both the first duplexer and the second duplexer via the switch.

In an example embodiment, the first impedance matching circuit may comprise at least one variable capacitor; wherein the second impedance matching circuit may comprise at least one variable capacitor; and wherein the at least one processor may be configured to change the center frequency of the second filter in the first duplexer to the first frequency or based on changing a capacitance value of the at least one variable capacitor in the second impedance matching circuit, change the center frequency of the second filter in the second duplexer to the second frequency based on changing a capacitance value of the at least one variable capacitor in the first impedance matching circuit.

In an example embodiment, An electronic device (e.g., electronic device 101) may comprise an antenna (e.g., first antenna 358), a radio frequency front end (RFFE) (e.g., first RFFE 310) comprising a switch (e.g., switch 340), a first duplexer (e.g., first duplexer 320) comprising a first filter (e.g., first filter 321) passing a first signal in uplink frequency range of a first frequency band and a second filter (e.g., second filter 322) passing a second signal in downlink frequency range of the first frequency band and a fourth signal in downlink frequency range of a second frequency band partially overlapping the downlink frequency range of the first frequency band and being connectable with the antenna via the switch, a second duplexer (e.g., second duplexer 330) comprising a first filter (e.g., first filter 331) passing a third signal in uplink frequency range of the second frequency band and a fifth signal in uplink frequency range of a third frequency band and a second filter (e.g., second filter 332) passing a sixth signal in downlink frequency range of the third frequency band that is separate from the downlink frequency range of the first frequency band and partially overlaps the downlink frequency range of the second frequency band and being connectable with the antenna via the switch, a first impedance matching circuit (e.g., first impedance matching circuit 346), electrically connected with a second filter in the first duplexer from among the first filter in the first duplexer and the second filter in the first duplexer, and a second impedance matching circuit (e.g., second impedance matching circuit 347), electrically connected with a second filter in the second duplexer from among the first filter in the second duplexer and the second filter in the second duplexer, and at least one processor (e.g., processor 300), operatively coupled with the RFFE, wherein the at least one processor may be configured to, while both the first duplexer and the second duplexer are connected with the antenna via the switch, change a characteristic of a filter from among the second filter in the first duplexer and the second filter in the second duplexer by using an impedance matching circuit from among the first impedance matching circuit and the second impedance matching circuit.

In an example embodiment, the at least one processor may be configured to while transmitting the first signal and receiving the second signal and the sixth signal via the antenna electrically connected with both the first duplexer and the second duplexer via the switch, change a characteristic of the second filter in the first duplexer by using the first impedance matching circuit from among the first impedance matching circuit and the second impedance matching circuit and while transmitting the third signal and receiving the fourth signal via the antenna electrically connected with both the first duplexer and the second duplexer via the switch, change a characteristic of the second filter in the second duplexer by using the second impedance matching circuit from among the first impedance matching circuit and the second impedance matching circuit.

In an example embodiment, the at least one processor may be further configured to, while the first duplexer from among the first duplexer and the second duplexer is electrically connected with the antenna via the switch, maintain the characteristic of the second filter in the first duplexer by using the first impedance matching circuit and while the second duplexer from among the first duplexer and the second duplexer is electrically connected with the antenna via the switch, maintain the characteristic of the second filter in the second duplexer by using the second impedance matching circuit.

In an example embodiment, the at least one processor may be configured to while transmitting the first signal and receiving the second signal via the antenna electrically connected with the first duplexer from among the first duplexer and the second duplexer via the switch, maintain the characteristic of the second filter in the first duplexer by using the first impedance matching circuit and while transmitting the fifth signal and receiving the sixth signal via the antenna electrically connected with the second duplexer from among the first duplexer and the second duplexer via the switch, maintain the characteristic of the second filter in the second duplexer by using the second impedance matching circuit.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
an antenna;
a radio frequency front end (RFFE) comprising:
   a first duplexer comprising:
     a first filter configured to pass a first signal in uplink frequency range of a first frequency band, and
     a second filter configured to pass:
       a second signal in downlink frequency range of the first frequency band, and
       a fourth signal in downlink frequency range of a second frequency band partially overlapping the downlink frequency range of the first frequency band; and
   a second duplexer comprising:
     a first filter configured to pass;
       a third signal in uplink frequency range of the second frequency band, and
       a fifth signal in uplink frequency range of a third frequency band, and
     a second filter configured to pass a sixth signal in downlink frequency range of the third frequency band that is separate from the downlink frequency range of the first frequency band and partially overlaps the downlink frequency range of the second frequency band;
at least one processor, comprising processing circuitry; and
memory comprising one or more storage media storing instructions to, when executed by the at least one processor individually and/or collectively, cause the electronic device to:
while both the first duplexer and the second duplexer are electrically connected with the antenna:
   based on controlling the first duplexer from among the first and second duplexers, adjust a cut-off frequency of the second filter in the first duplexer to a first frequency cutting off the sixth signal in a portion of the downlink frequency range of the third frequency band partially overlapping the downlink frequency range of the second frequency band, and/or
   based on controlling the second duplexer from among the first and second duplexers, adjust a cut-off frequency of the second filter in the second duplexer to a second frequency cutting off the fourth signal in a portion of the downlink frequency range of the second frequency band partially overlapping the downlink frequency range of the third frequency band.

2. The electronic device of claim 1, wherein the instructions, when executed individually and/or collectively by the at least one processor, cause the electronic device to:
while transmitting the third signal and receiving the fourth signal via the antenna, which is electrically connected with both the first duplexer and the second duplexer, adjust the cut-off frequency of the second filter in the second duplexer to the second frequency; and
while transmitting the first signal and receiving the second signal and the sixth signal via the antenna, which is electrically connected with both the first duplexer and the second duplexer, adjust the cut-off frequency of the second filter in the first duplexer to the first frequency.

3. The electronic device of claim 1, wherein the instructions, when executed individually and/or collectively by the at least one processor, cause the electronic device to:
while the first duplexer, from among the first duplexer and the second duplexer, is electrically connected with the antenna, maintain the cut-off frequency of the second filter in the first duplexer as a third frequency passing both the second signal in the downlink frequency range of the first frequency band and the fourth signal in the downlink frequency range of the second frequency band; and while the second duplexer, from among the first duplexer and the second duplexer, is electrically connected with the antenna, maintain the cut-off frequency of the second filter in the second duplexer as a fourth frequency passing the sixth signal in the downlink frequency range of the third frequency band.

4. The electronic device of claim 3, wherein the instructions, when executed individually and/or collectively by the at least one processor, cause the electronic device to:
while transmitting the first signal and receiving the second signal via the antenna, which is electrically connected with the first duplexer from among the first duplexer and the second duplexer, maintain the cut-off frequency of the second filter in the first duplexer as the third frequency; and
while transmitting the fifth signal and receiving the sixth signal via the antenna, which is electrically connected with the second duplexer from among the first duplexer and the second duplexer, maintain the cut-off frequency of the second filter in the second duplexer as the fourth frequency.

5. The electronic device of claim 1, wherein the RFFE further comprises a switch,
wherein the first duplexer is connectable with the antenna via the switch,
wherein the second duplexer is connectable with the antenna via the switch, and
wherein the instructions, when executed individually and/or collectively by the at least one processor, cause the electronic device to, while controlling the switch to electrically connect both the first duplexer and the second duplexer with the antenna, adjust the cut-off frequency of the second filter in the first duplexer to the first frequency, and/or the cut-off frequency of the second filter in the second duplexer to the second frequency.

6. The electronic device of claim 5, wherein the instructions, when executed individually and/or collectively by the at least one processor, cause the electronic device to:
while controlling the switch to electrically connect the first duplexer from among the first duplexer and the second duplexer with the antenna, maintain the cut-off frequency of the second filter in the first duplexer as a third frequency passing both the second signal in the downlink frequency range of the first frequency band and the fourth signal in the downlink frequency range of the second frequency band; and
while controlling the switch to electrically connect the second duplexer from among the first duplexer and the second duplexer with the antenna, maintain the cut-off frequency of the second filter in the second duplexer as a fourth frequency passing the sixth signal in the downlink frequency range of the third frequency band.

7. The electronic device of claim 5, wherein the RFFE further comprises:
first impedance matching circuitry, electrically connected with the first duplexer, and electrically connected with the switch; and
second impedance matching circuitry, electrically connected with the second duplexer, and electrically connected with the switch, and wherein the instructions, when executed by the at least one processor, cause the electronic device to:
while controlling the switch to electrically connect both the first duplexer and the second duplexer with the antenna:
based on controlling the first impedance matching circuitry from among the first impedance matching circuitry and the second impedance matching circuitry, and adjust the cut-off frequency of the second filter in the first duplexer to the first frequency using at least the first impedance matching circuitry, and/or
based on controlling the second impedance matching circuitry from among the first impedance matching circuitry and the second impedance matching circuitry, adjust the cut-off frequency of the second filter in the second duplexer to the second frequency using at least the second impedance matching circuitry.

8. The electronic device of claim 5, wherein the RFFE further comprises:
first impedance matching circuitry electrically connected with the second filter in the first duplexer; and
second impedance matching circuitry electrically connected with the second filter in the second duplexer, and
wherein the instructions, when executed individually and/or collectively by the at least one processor, cause the electronic device to:
while controlling the switch to electrically connect both the first duplexer and the second duplexer with the antenna:
based on controlling the first impedance matching circuitry from among the first impedance matching circuitry and the second impedance matching circuitry, adjust the cut-off frequency of the second filter in the first duplexer to the first frequency using at least the first impedance matching circuitry, and/or
based on controlling the first impedance matching circuitry from among the first impedance matching circuitry and the second impedance matching circuitry, adjust the cut-off frequency of the second filter in the second duplexer to the second frequency using at least the second impedance matching circuitry.

9. The electronic device of claim 1, wherein the antenna comprises a first antenna,
wherein the electronic device further comprises:
a second antenna; and
another RFFE, comprising:
a duplexer comprising a first filter configured to pass the fifth signal and a second filter configured to pass the sixth signal; and
a filter configured to pass the second signal, and
wherein the instructions, when executed individually and/or collectively by the at least one processor, cause the electronic device to:
adjust the cut-off frequency of the second filter in the first duplexer, while transmitting the first signal and receiving the second signal and the sixth signal via the first antenna electrically connected with both the first duplexer and the second duplexer, to the second frequency; and
transmit the fifth signal and receive the second signal and the sixth signal via the second antenna electrically connected with both the duplexer and the filter in the another RFFE, while transmitting the first signal and receiving the second signal and the sixth signal via the first antenna electrically connected with both the first duplexer and the second duplexer.

10. The electronic device of claim 1, wherein the uplink frequency range of the first frequency band, the uplink frequency range of the second frequency band, and the uplink frequency range of the third frequency band are separated from each other.

11. An electronic device comprising:
an antenna;
a radio frequency front end (RFFE) comprising:
  a switch,
  a first duplexer connectable to the antenna via the switch, the first duplexer comprising:
    a first filter configured to pass a first signal in uplink frequency range of a first frequency band, and
    a second filter, configured to pass:
      a second signal in downlink frequency range of the first frequency band, and
      a fourth signal in downlink frequency range of a second frequency band partially overlapping the downlink frequency range of the first frequency band;
  a second duplexer connectable with the antenna via the switch, the second duplexer comprising:
    a first filter configured to pass:
      a third signal in uplink frequency range of the second frequency band, and
      a fifth signal in uplink frequency range of a third frequency band, and
    a second filter configured to pass a sixth signal in downlink frequency range of the third frequency band that is separate from the downlink frequency range of the first frequency band and partially overlaps the downlink frequency range of the second frequency band,
  first impedance matching circuitry, electrically connected with a first electrical path between the switch and the first duplexer, and
  second impedance matching circuitry, electrically connected with a second electrical path between the switch and the second duplexer;
at least one processor comprising processing circuitry; and
memory comprising one or more storage media storing instructions to, when executed individually and/or collectively by the at least one processor, cause the electronic device to:
  while both the first duplexer and the second duplexer are electrically connected with the antenna via the switch:
    based on controlling the first impedance matching circuitry from among the first impedance matching circuitry and the second impedance matching circuitry, adjust a center frequency of the second filter in the first duplexer to a first frequency cutting off the sixth signal in portion of the downlink frequency range of the third frequency band partially overlapping the downlink frequency range of the second frequency band using at least the first impedance matching circuitry, and/or
    based on controlling the second impedance matching circuitry from among the first impedance matching circuitry and the second impedance matching circuitry, adjust a center frequency of the second filter in the second duplexer to a second frequency cutting off the fourth signal in portion of the downlink frequency range of the second frequency band partially overlapping the downlink frequency range of the third frequency band using at least the second impedance matching circuitry.

12. The electronic device of claim 11, wherein the instructions, when executed individually and/or collectively by the at least one processor, cause the electronic device to:
  while transmitting the first signal and receiving the second signal and the sixth signal via the antenna, which is electrically connected with both the first duplexer and the second duplexer via the switch, adjust the center frequency of the second filter in the first duplexer to the first frequency using the first impedance matching circuitry from among the first impedance matching circuitry and the second impedance matching circuitry; and
  while transmitting the third signal and receiving the fourth signal via the antenna, which is electrically connected with both the first duplexer and the second duplexer via the switch, adjust the center frequency of the second filter in the second duplexer to the second frequency using the second impedance matching circuitry from among the first impedance matching circuitry and the second impedance matching circuitry.

13. The electronic device of claim 11, wherein the instructions, when executed individually and/or collectively by the at least one processor, cause the electronic device to:
  while the first duplexer from among the first duplexer and the second duplexer is electrically connected with the antenna via the switch, maintain the center frequency of the second filter in the first duplexer as a third frequency passing both the second signal in the downlink frequency range of the first frequency band and the fourth signal in the downlink frequency range of the second frequency band using at least the first impedance matching circuitry; and
  while the second duplexer from among the first duplexer and the second duplexer is electrically connected with the antenna via the switch, maintain the center frequency of the second filter in the second duplexer as a fourth frequency passing the sixth signal in the downlink frequency range of the third frequency band using at least the second impedance matching circuitry.

14. The electronic device of claim 13, wherein the instructions, when executed individually and/or collectively by the at least one processor, cause the electronic device to:
  while transmitting the first signal and receiving the second signal via the antenna, which is electrically connected with the first duplexer from among the first duplexer and the second duplexer via the switch, maintain the center frequency of the second filter in the first duplexer as the third frequency using at least the first impedance matching circuitry; and
  while transmitting the fifth signal and receiving the sixth signal via the antenna, which is electrically connected with the second duplexer from among the first duplexer and the second duplexer via the switch, maintain the center frequency of the second filter in the second duplexer as the fourth frequency using at least the second impedance matching circuitry.

15. The electronic device of claim 11, wherein the antenna comprises a first antenna,
  wherein the electronic device further comprises:
  a second antenna; and
  another RFFE comprising:
    another switch;
    a duplexer comprising a first filter passing the fifth signal and a second filter passing the sixth signal, and
    a filter configured to pass the second signal, and wherein the instructions, when executed individually and/or collectively by the at least one processor, cause the electronic device to:

while transmitting the first signal and receiving the second signal and the sixth signal via the first antenna electrically connected with both the first duplexer and the second duplexer via the switch, adjust the center frequency of the second filter in the first duplexer to the first frequency using at least the first impedance matching circuitry; and while transmitting the first signal and receiving the second signal and the sixth signal via the first antenna electrically connected with both the first duplexer and the second duplexer via the switch:
  transmit the fifth signal, and
  receive the second signal and the sixth signal via the second antenna electrically connected with both the duplexer and the filter in the another RFFE via the another switch.

16. The electronic device of claim 11, wherein the first impedance matching circuitry comprising at least one variable capacitor;

wherein the second impedance matching circuitry comprising at least one variable capacitor; and wherein the instructions, when executed individually and/or collectively by the at least one processor, cause the electronic device to:

based on changing a capacitance value of the at least one variable capacitor in the first impedance matching circuitry, adjust the center frequency of the second filter in the first duplexer to the first frequency, and/or based on changing a capacitance value of the at least one variable capacitor in the second impedance matching circuitry, adjust the center frequency of the second filter in the second duplexer to the second frequency.

17. An electronic device comprising:
an antenna;
a radio frequency front end (RFFE) comprising:
  a switch,
  a first duplexer connectable with the antenna via the switch, the first duplexer comprising:
    a first filter configured to pass a first signal in uplink frequency range of a first frequency band, and
    a second filter configured to pass:
      a second signal in downlink frequency range of the first frequency band, and
      a fourth signal in downlink frequency range of a second frequency band partially overlapping the downlink frequency range of the first frequency band,
  a second duplexer connectable with the antenna via the switch, the second duplexer comprising:
    a first filter configured to pass:
      a third signal in uplink frequency range of the second frequency band, and
      a fifth signal in uplink frequency range of a third frequency band, and
    a second filter configured to pass a sixth signal in downlink frequency range of the third frequency band that is separate from the downlink frequency range of the first frequency band and partially overlaps the downlink frequency range of the second frequency band;
  first impedance matching circuitry electrically connected with a second filter in the first duplexer from among the first filter in the first duplexer and the second filter in the first duplexer; and
  second impedance matching circuitry electrically connected with a second filter in the second duplexer from among the first filter in the second duplexer and the second filter in the second duplexer;
at least one processor comprising processing circuitry; and
memory comprising one or more storage media storing instructions to, when executed individually and/or collectively by the at least one processor, cause the electronic device to:
  while both the first duplexer and the second duplexer are electrically connected with the antenna via the switch, adjust a characteristic of a filter from among the second filter in the first duplexer and the second filter in the second duplexer using at least an impedance matching circuitry from among the first impedance matching circuitry and the second impedance matching circuitry.

18. The electronic device of claim 17, wherein the instructions, when executed individually and/or collectively by the at least one processor, cause the electronic device to:

while transmitting the first signal and receiving the second signal and the sixth signal via the antenna electrically connected with both the first duplexer and the second duplexer via the switch, adjust a characteristic of the second filter in the first duplexer using the first impedance matching circuitry from among the first impedance matching circuitry and the second impedance matching circuitry; and while transmitting the third signal and receiving the fourth signal via the antenna electrically connected with both the first duplexer and the second duplexer via the switch, adjust a characteristic of the second filter in the second duplexer using the second impedance matching circuitry from among the first impedance matching circuitry and the second impedance matching circuitry.

19. The electronic device of claim 17, wherein the instructions, when executed individually and/or collectively by the at least one processor, cause the electronic device to:

while the first duplexer from among the first duplexer and the second duplexer is electrically connected with the antenna via the switch, maintain the characteristic of the second filter in the first duplexer using at least the first impedance matching circuitry; and while the second duplexer from among the first duplexer and the second duplexer is electrically connected with the antenna via the switch, maintain the characteristic of the second filter in the second duplexer by using at least the second impedance matching circuitry.

20. The electronic device of claim 19, wherein the instructions, when executed individually and/or collectively by the at least one processor, cause the electronic device to:

while transmitting the first signal and receiving the second signal via the antenna electrically connected with the first duplexer from among the first duplexer and the second duplexer via the switch, maintain the characteristic of the second filter in the first duplexer using at least the first impedance matching circuitry; and while transmitting the fifth signal and receiving the sixth signal via the antenna electrically connected with the second duplexer from among the first duplexer and the second duplexer via the switch, maintain the characteristic of the second filter in the second duplexer using at least the second impedance matching circuitry.

* * * * *